United States Patent
Lee et al.

(10) Patent No.: US 6,333,862 B1
(45) Date of Patent: Dec. 25, 2001

(54) SWITCHED MODE POWER SUPPLY AND CONTROLLING METHOD THEREOF

(75) Inventors: Dong Ju Lee, Pyungtaek; Dae Beum Pyeon, Suwon, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/373,075

(22) Filed: Aug. 11, 1999

(30) Foreign Application Priority Data

Aug. 11, 1998 (KR) .................................................. 98-32578

(51) Int. Cl.$^7$ .................................................. H02M 3/335
(52) U.S. Cl. .................................................. 363/21
(58) Field of Search ................................. 363/16, 17, 20, 363/21, 95, 97, 131

(56) References Cited

U.S. PATENT DOCUMENTS

| | | | |
|---|---|---|---|
| 4,766,528 | * 8/1988 | Marinus | 363/21 |
| 5,126,930 | * 6/1992 | Ahn | 363/21 |
| 5,414,475 | 5/1995 | Trzyna et al. . | |
| 5,689,407 | * 11/1997 | Marinus | 363/21 |
| 5,920,466 | * 7/1999 | Hirahara | 363/21 |
| 5,999,421 | * 12/1999 | Liu | 363/21 |
| 6,018,467 | * 1/2000 | Majid et al. | 363/21 |

* cited by examiner

*Primary Examiner*—Matthew Nguyen (57) ABSTRACT

A power supply circuit includes a power converter and a control circuit. The power converter converts AC power to DC power, and the control circuit controls operation of the power converter. The control circuit repeatedly enables the conversion operation of the power converter for a first predetermined period of time and disables the conversion operation for a second predetermined period of time, greater than said first predetermined period of time, in a power saving mode of operation.

32 Claims, 9 Drawing Sheets

SWITCHED MODE POWER SUPPLY AND CONTROLLING METHOD THEREOF

BACKGROUND OF THE INVENTION

1. Field of the Invention

The present invention relates to a power supply, in particular to a switched mode power supply (SMPS) and a method of controlling the same.

2. Description of the Background Art

In a conventional switched mode power supply (SMPS), when the electrical loads connected with an output terminal of the switched mode power supply do not draw electric power, the switched mode power supply assumes a standby state. Only is when the electric loads require power, the SMPS provides power to the electric loads, by operating in a normal mode.

Figure 1:
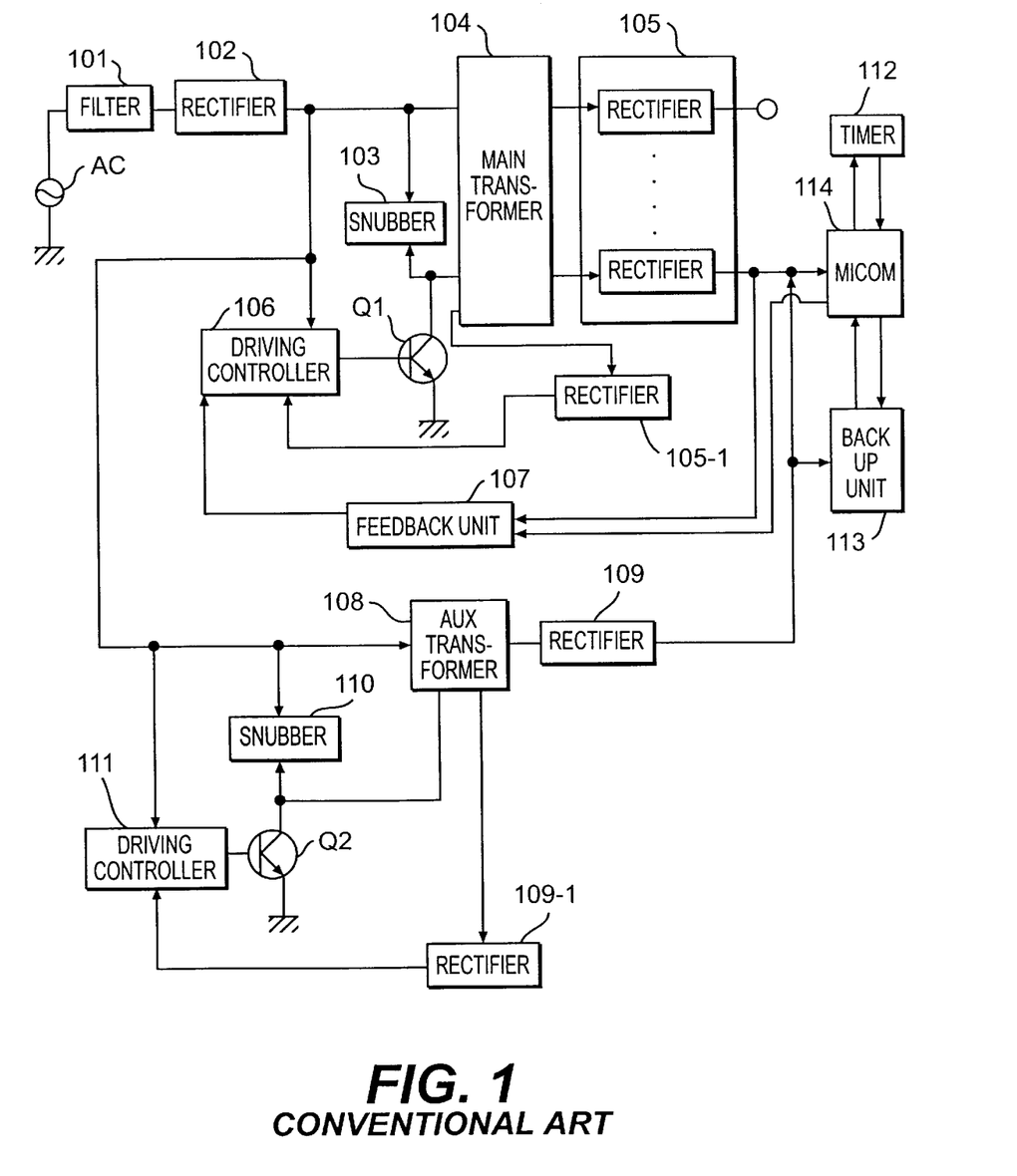
FIG. 1 is a schematic block diagram illustrating a switched mode power supply according to the conventional art.

FIG. 1 illustrates a circuit of a switched mode power supply which is composed of a main power unit, an auxiliary power unit and a controller.

The main power unit includes an input filter unit 101 removing noise from AC power supplied from an AC power source, a rectification/smoothing unit 102 rectifying the AC power to DC by a full wave rectification and smoothing the DC voltage to a certain level, a main transformer 104 to a primary winding of which is repeatedly supplied and disconnected DC power supplied from the rectification/smoothing unit 102 in accordance with an ON/OFF operation of a switching device Q1, a snubber 103 removing noise from power supplied to the primary winding of transformer 104, the noise generated when the switching device Q1 is operated, a rectification/smoothing unit 105 rectifying AC voltages induced in the secondary windings of the main transformer 104 and smoothing the resulting DC voltage to a certain level, a rectification/smoothing unit 105-1 generating a certain direct current voltage from the AC voltage induced in an auxiliary winding of the main transformer 104, and a driving controller 106 receiving an output voltage of the rectification/smoothing unit 102 and the direct current voltage from the rectification/smoothing unit 105-1 and controlling an ON/OFF operation of the switching device Q1 in accordance with a control signal from a signal feedback unit 107, which will be explained later.

The auxiliary power unit includes a driving controller 111 receiving an output voltage of the rectification/smoothing unit 102 and controlling an ON/OFF operation of a switching device Q2, and an auxiliary transformer 108 to a primary winding of which is repeatedly supplied and disconnected the output voltage of the rectification/smoothing unit 102 in accordance with the ON/OFF operation of the switching device Q2 thereby inducing an AC voltage in a secondary winding of the auxiliary transformer 108 which is connected to a rectification/smoothing unit 109 and a rectification/smoothing unit 109-1. The rectification/smoothing unit 109-1 rectifies the AC voltage induced in the secondary winding of auxiliary transformer 108 and outputs a certain direct current voltage to the driving controller 111 in accordance with the switching operation of the switching device Q2. The rectification/smoothing unit 109 rectifies the voltage induced in the secondary winding of the auxiliary transformer 108 in accordance with a switching operation of the switching device Q2 and smoothes the thusly rectified a direct current voltage. The auxiliary power unit also includes a snubber 110 removing noise which is generated in the auxiliary transformer 108 when the switching device Q2 is operated.

The control unit includes a microcomputer 114 receiving as its supply power in a normal operating mode an output voltage among the output voltages outputted from the rectification/smoothing unit 105, and also receiving an output voltage of the rectification unit 109 as a supply voltage in a power saving mode. The microcomputer 114 outputs a control signal for controlling an ON/OFF operation of the switching device Q1 in the normal mode. The control unit also includes a signal feed back unit 107 detecting information on the state of the power consumption of loads connected to the output terminals of the rectification smoothing unit 105 receiving a control signal from the microcomputer 114 10 and transferring the information and the control signal to the driving controller 106, a timer 112 generating a timing signal and supplying the thusly generated timing signal to the microcomputer 114, and a backup unit 113 receiving a direct current voltage from the rectification/smoothing unit 105 and also from the rectification/smoothing unit 109 and storing backup power for operating of the microcomputer 114 in the standby mode.

Figure 2:
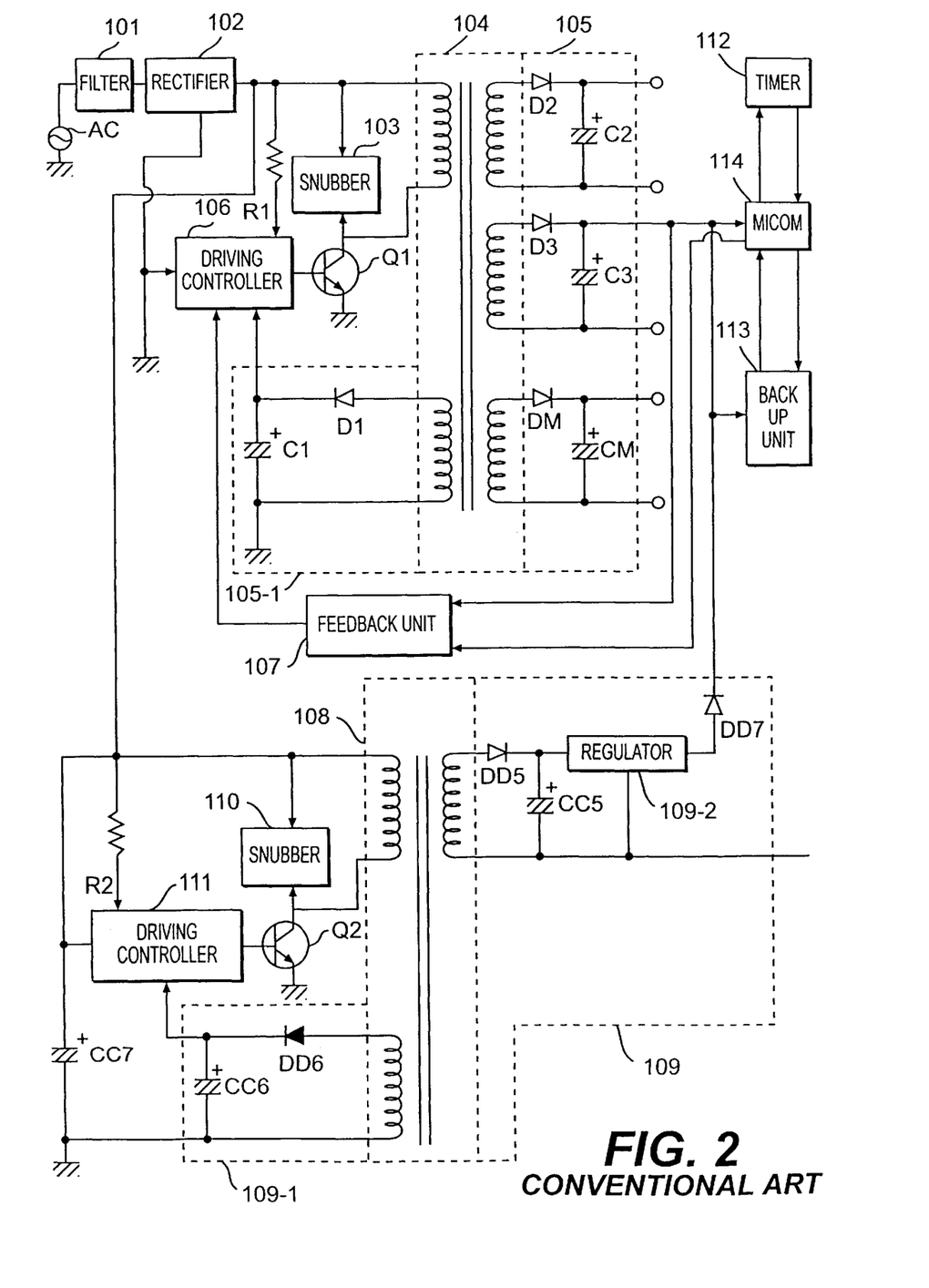
FIG. 2 is a detailed schematic circuit diagram of the switched mode power supply of FIG. 1.

As shown in FIG. 2 illustrating in detail the circuit of FIG. 1, the rectification/smoothing units 105, 105-1, 109 and 109-1 are circuits each formed of a diode D1–DM, DD5–DD6 and a capacitor C1–CM, CC5–CC6. The rectification/smoothing unit 109 further includes a regulator 109-2 and a diode DD7.

The operation of the thusly constituted conventional switched mode power supply will be explained.

When AC mains power is applied into the input filter unit 101, the input filter unit 101 removes noise from the AC mains power and outputs it to the rectification/smoothing unit 102. The rectification/smoothing unit 102 rectifies the noise-removed AC power by a full wave rectification, smoothes it, and then outputs a certain level direct current voltage to the primary windings of the transformers 104 and 108.

At this time, as the driving controller 106 in the main power unit turns on/off the switching device Q1 on/off, AC voltages are induced in the secondary windings of the main transformer 104 and are applied to the rectification/smoothing unit 105. As the driving controller 111 in the auxiliary power unit turns the switching device Q2 on/off, an AC voltage is induced in the secondary winding of the auxiliary transformer 108 and is applied to the rectification/smoothing unit 109.

The rectification/smoothing unit 105 outputs the DC voltages which are smoothed after a half wave rectification to the loads (not shown), and the rectification/smoothing unit 109 outputs a regulated voltage, which is smoothed after a half wave rectification through the regulator circuit 109-2 and the diode DD7. At this time, the regulated voltage outputted from the rectification/smoothing unit 109 is supplied to the back-up unit 113 and the microcomputer 114 via a line connected with diode DD7.

In the normal mode in which the loads normally consume power, the rectification/smoothing unit 105 outputs a plurality of output voltages, and if one of the output voltages is applied as a supply voltage of the microcomputer 114, a positive voltage is applied at the output terminal of the diode DD7 connected with the output terminal of the rectification/smoothing unit 109, so that the diode DD7 does not forwardly conduct. Therefore, the regulated voltage outputted from the rectification/smoothing unit 109 is not applied to the microcomputer 114. The microcomputer 114 receives a supply voltage from the rectification/smoothing unit 105 and controls the entire operations of the system based on a timing signal generated by the timer 112 for thereby controlling the power state of the loads.

When the microcomputer 114 checks the power consumption state of the loads, if it is judged that the loads do not consume much power, the microcomputer 114 controls the system and changes the normal mode into a power saving mode.

In the power saving mode, the microcomputer 114 outputs an ON/OFF control signal which controls the switching device Q1 at a low frequency by controlling the driving controller 106 via the signal feedback unit 107 so that power corresponding to the lower power consumption of the loads is outputted. Namely, when the microcomputer 114 increases the ON/OFF operation time of the switching device Q1, the levels of the voltages induced in the secondary windings of the main transformer 104 are decreased. Therefore, the rectification smoothing unit 105 which receives the lower voltage levels supplies DC voltages corresponding to the power consumed by the loads.

If the microcomputer 114 judges that the loads do not consume power, the operation mode of the switched mode power supply is changed to a standby mode. In the standby mode, the microcomputer 114 controls the driving controller 106 via the signal feed back unit 107, so that the switching device Q1 is not operated, and the inductive voltages are not generated in the secondary windings of the main transformer 104. Therefore, the rectification/smoothing unit 105 does not output any voltages. In the standby mode, only the auxiliary power supply circuit continues to operates. When the power supply assumes a standby mode in accordance with the control of the microcomputer 114, the regulated voltage outputted from the rectification/smoothing unit 109 of the auxiliary power supply circuit is applied as a supply voltage to the microcomputer 114 via the diode DD7. Here, when the power supply operates in the normal mode or the power saving mode, the backup unit 113 receives an output voltage from the rectification smoothing unit 105 or 109 and charges to a certain voltage. Even in the standby mode, if the power is OFF, the charged voltage is supplied to the microcomputer 114, so that the microcomputer 114 continuously operates.

In the conventional switched mode power supply, there are provided both the main power supply circuit which supplies electric power to the loads in the normal mode, and the auxiliary power supply circuit which supplies a minimum power when the system operates in the standby mode in which the loads do not consume power. Therefore, the system becomes bulky and complicated. In the normal mode in which the loads normally consume power, since the main power supply circuit and the auxiliary power supply circuit are both operated at the same time, excessive noise is generated at the switching devices Q1 and Q2. In addition, since the switching devices Q1 and Q2 are continuously operated, as time elapses, the reliability of the switching devices Q1 and Q2 is decreased, so that the power consumption of the switched mode power supply is increased. Therefore, the switched mode power supply in accordance with the conventional art is not widely used for an electric appliance. Namely, the above-described switched mode power supply is used only for an expensive apparatus.

As another example of a conventional switched mode power supply, there is known a power supply in which the power outputted from the secondary winding of a transformer is controlled in the standby mode.

However, the above-described example also becomes complicated, since the system must include a higher number of circuit parts. Additionally the system is bulky, the reliability of the system is decreased, and also the fabrication cost is increased.

In a switched mode power supply for turning off the unnecessary power supply circuit in a standby mode, there is a limit on decreasing the power consumption since the switched mode power supply which uses power outputted from the auxiliary power supply circuit in the standby mode must necessarily include a certain number of parts. Therefore, the power supply becomes complicated, and the reliability of the circuit is also decreased.

A power supply capable of disconnecting from the AC power source by using a mechanical switch, in the view of decreasing the power consumption, offers advantages. However, since the AC power source turn on/off switch must be operated mechanically whenever the loads require power, the power supply is very inconvenient to use. In addition, when the AC power source on/off switch is turned off, for example, an apparatus such as a VCR can not record a reserved TV program or can not perform other functions.

SUMMARY OF THE INVENTION

It is an object of the present invention to provide a switched mode power supply which makes it possible to decrease a power consumption by supplying electric power for a certain time during a recurring period in a standby mode.

It is another object of the present invention to provide a switched mode power supply which is capable of quickly supplying electric power in accordance with a power turn-on instruction signal which is inputted by a user in a standby mode.

It is a further object of the present invention to provide a controlling method for a switched mode power supply which is capable of decreasing power consumption by supplying power for a certain time during a certain period in a standby mode.

In order to achieve the above objects, there is provided a switched mode power supply according to a first embodiment of the present invention which comprises a driving controller for controlling a driving operation of the power supply circuit, a signal feedback device for repeatedly stopping the operation of the driving controller for a certain time tOFF during a certain period tON+tOFF in the standby mode, and a controller for controlling the operation of the driving controller via the signal feedback device so that the operation of the power supply is repeatedly stopped for the certain time tOFF during the recurring period tON+tOFF when the standby mode is set, whereby the power consumption in the standby mode is minimized.

In a second embodiment of the present invention, the signal feedback device comprises a first signal feedback unit receiving a level of the output voltage in a secondary winding of a transformer of the power supply circuit and controlling the driving controller in accordance therewith, whereby out voltages of the power supply circuit are maintained to be a constant voltage level when loads connected with output windings of the power supply circuit consume power in an active state of the SMPS, and a second signal feedback unit for stopping the operation of the driving controller in order to stop the power generation by the power supply circuit for the certain time tOFF in accordance with a control of the controller in the standby mode.

In a third embodiment of the present invention, the switched mode power supply further comprises a switching unit connected with output windings of the power supply circuit for disconnecting loads connected with output windings of the power supply circuit from the power supply circuit in accordance with a control of the controller.

In a fourth embodiment of the present invention, the signal feedback device comprises, a first switching unit for controlling the operation of the driving controller, a second switching unit for transferring a control signal from the controller to the first switching unit, a first signal feedback unit for receiving a level of the output voltages in a secondary winding of a transformer of the power supply circuit and controlling the driving controller in accordance therewith, whereby out voltages of the power supply circuit are maintained to be a constant voltage level, and a second signal feedback unit for transferring a control signal to the second switching unit in accordance with a control of the controller.

In a fifth embodiment of the present invention, the signal feedback device comprises a third switching unit and a fourth switching unit for controlling the operation of the first switching unit, a first signal feedback unit for receiving a level of the output voltages in a secondary winding of a transformer of the power supply circuit and controlling the driving controller in accordance therewith, whereby out voltages of the power supply circuit are maintained to be a constant voltage level, and a second signal feedback unit for transferring a control signal to the third switching unit in accordance with a control of the controller.

In a sixth embodiment of the present invention, there provided a power supply which generates a plurality of DC supply voltages from AC mains power, the power consumption decreasing apparatus for the power supply comprises a controller for controlling an operation of the power supply and generating a control signal for repeatedly disconnecting the power supply from AC mains power for a certain time tOFF during a certain period tON+tOFF in a standby mode. A signal feed back device for controls the supply of AC mains power to the power supply and the disconnects of AC mains power therefrom in accordance with the control signal from the controller.

In a seventh embodiment of the present invention, the signal feed back unit comprises a first signal feed back unit for receiving a level of the output voltages in a secondary winding of a main transformer of the power supply circuit and controlling the driving controller in accordance therewith, whereby out voltages of the power supply circuit are maintained to be a constant voltage level, and for activating the driving controller when an output voltage of the power supply circuit is an active state of SMPS, a second signal feed back unit for generating an output signal for controlling the supplying of AC mains power to the power supply to stop a power generation of the power supply for the certain time tOFF in accordance with the control signal from the controller in the standby mode, and a switching unit for supplying AC mains power to the power supply and disconnecting the AC mains power therefrom in accordance with the output signal of the second signal feedback unit.

In a eighth embodiment of the present invention, a method for decreasing a power consumption for a switched mode power supply comprises a first step for judging whether a standby mode is set and a second step for periodically outputting power to the windings of the power supply only during a certain interval tON of a certain period interval tON+tOFF when the standby mode is judged set as a result of the judgement of the first step.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, wherein like reference numerals designate like components or elements to eliminate redundant description, and wherein.

DETAILED DESCRIPTION OF THE PREFERRED EMBODIMENTS

The embodiments of a switched mode power supply implementing a reduced power consumption according to the present invention will be explained with reference to the accompanying drawings.

Figure 3:
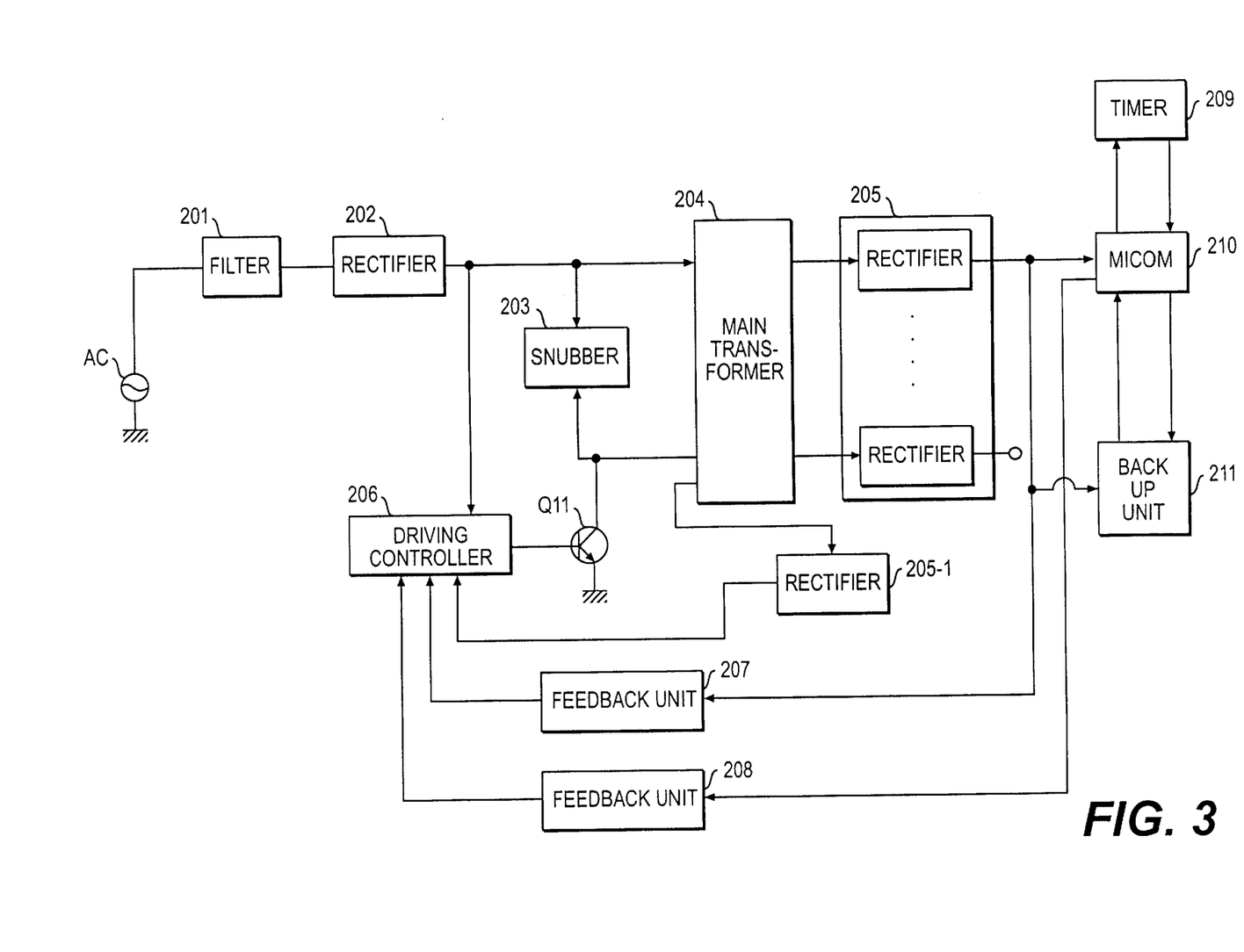
FIG. 3 is a schematic block diagram illustrating a switched mode power supply implementing a reduced power consumption method according to a first embodiment of the present invention.

FIG. 3 illustrates a first embodiment of a switched mode power supply implementing a reduced power consumption method according to the present invention which is composed of a main power unit and a controller.

The main power unit includes an input filter unit 201 removing noise from mains power supplied from an AC power source, a rectification/smoothing unit 202 receiving noise-removed AC power from the input filter unit 201, rectifying it by a full wave rectification and smoothing the same and outputting a DC voltage, a main transformer 204 to a primary winding of which is supplied the DC voltage from the rectification/smoothing unit 202 in accordance with an ON/OFF operation of a switching device Q11 controlling the flow of current through the primary winding of the transformer 204, a rectification/smoothing unit 205 rectifying AC voltages induced in secondary windings of the main transformer 204 and outputting a plurality of DC voltages, a rectification/smoothing unit 205-1 rectifying an AC voltage induced in an auxiliary winding of the main transformer 204 in accordance with an ON/OFF operation of the switching device Q11 and outputting a DC voltage, and a driving controller 206 receiving output voltages outputted from the rectification/smoothing unit 202 and the rectification/ smoothing unit 205-1 and controlling the switching device Q11 in accordance with control signals outputted from signal feedback units 207 and 208, which will be described later.

The control unit includes a microcomputer 210 receiving as its supply voltage one output voltage among the plurality of output voltages outputted from the rectification/smoothing unit 205 and controlling the system, a backup unit 211 charging based on a voltage outputted from the rectification/smoothing unit 205 and supplying power to the microcomputer 210 in a standby mode, a timer 209 generating a timing signal for the microcomputer 210, a signal feedback unit 207 sensing the level of the output voltage received from the rectification/smoothing unit 205 and transferring the voltage to the driving controller 206 so that the driving controller 206 controls the switching device Q11 to operate the transformer 204, and a signal feedback unit 208 receiving a control signal from the microcomputer 210 and transferring it to the driving controller 206 in the standby mode.

Figure 4:
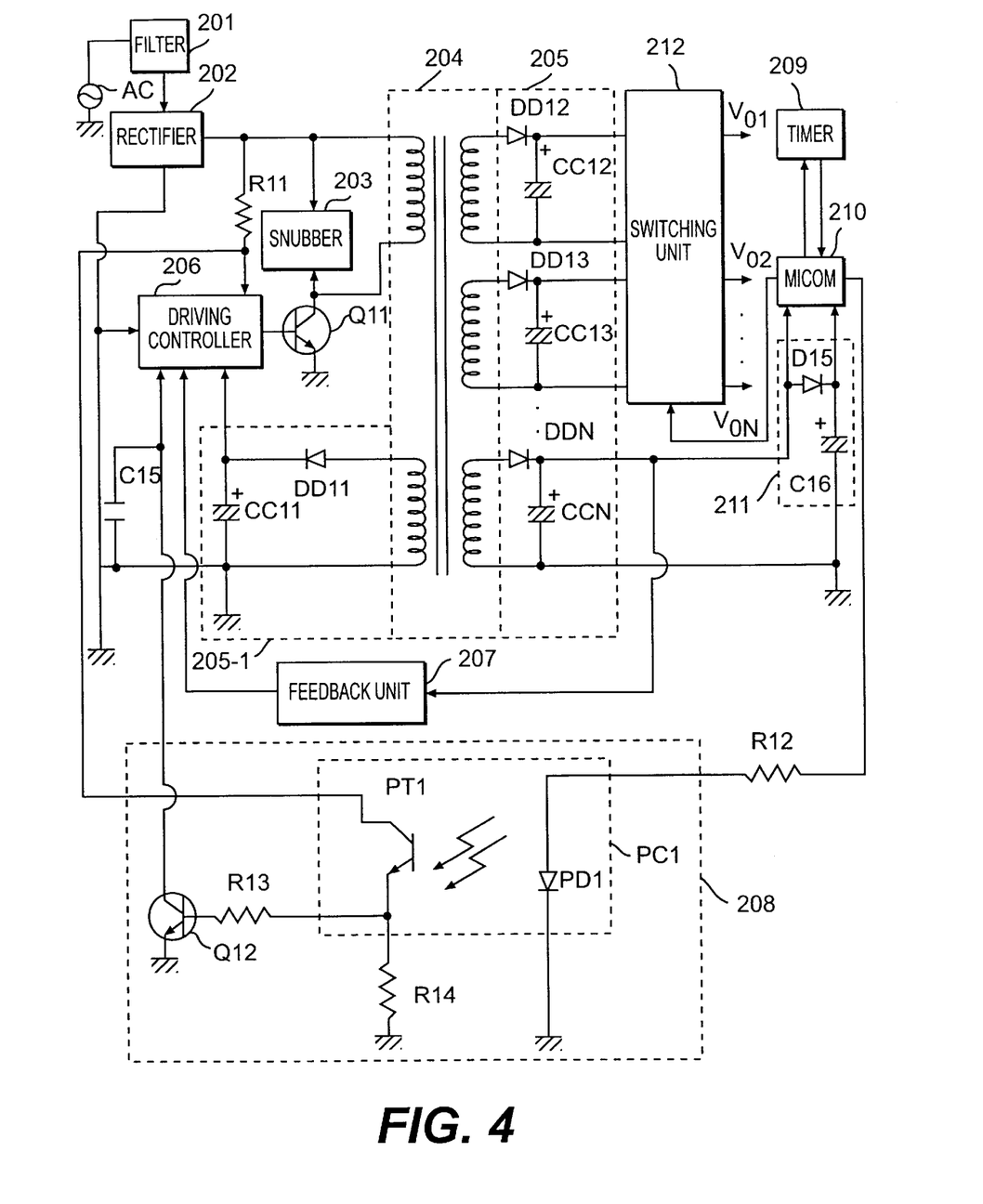
FIG. 4 is a detailed schematic circuit diagram of the switched mode power supply of FIG. 3.

FIG. 4 is a detailed schematic circuit diagram of the switched mode power supply of FIG. 3. As shown, the power supply which further includes a switching unit 212, which receives the plurality of output voltages from the rectification/smoothing unit 205 and outputs respective voltages Vo1, Vo2, . . . , VoN in accordance with a control of the microcomputer 210. The signal feedback unit 208 includes a photo-coupler PC1 the receiver of which is supplied with DC power from the rectification/smoothing unit 202 the output of which is connected to ground via a resistor R14, and which outputs a certain DC voltage in accordance with a control signal from the microcomputer 210 applied at an emitter thereof. The signal feedback unit 208 also includes and a switching device Q12 outputting a control signal for activating or deactivating the driving controller 206 in the standby mode in accordance with the DC voltage outputted from the photo-coupler PC1 via a resistor R13. In addition, the backup unit 211 includes a diode D15 and a capacitor C16, which charges based on an output voltage from the rectification/smoothing unit 205.

As further shown in FIG. 4, a resistor R11 connects the rectifier 202 to the driving controller 206, a capacitor C15 connects the output of the signal feedback unit 208 to ground, and the primary winding and each of the secondary windings of the rectification/smoothing unit 205 are connected to a diode DD11–DDN and a capacitor CC11–CCN.

The operation of the first embodiment of the switched mode power supply according to the present invention will be explained as follows.

In the normal mode in which loads (not shown) normally consume power, the input filter unit 201 receives the mains AC voltage from the AC power source, removes noise from power supplied from the AC power source and outputs the noise-removed AC voltage to the rectification/smoothing unit 202. The rectification/smoothing unit 202 rectifies the noise-removed AC power by a full wave rectification and smoothes and outputs a DC voltage to the primary winding of the main transformer 204 and the driving controller 206. The driving controller 206 turns the switching device Q11 on/off, whereby AC voltages are induced in the secondary windings of the main transformer 204. The thusly induced AC voltages are applied to the rectification/smoothing unit 205. The rectification/smoothing unit 205 rectifies the induced AC voltages by a half wave rectification and smoothes and outputs the resultant DC voltages to the switching unit 212. The switching unit 212, which is controlled by the microcomputer 210, outputs the plurality of DC voltages Vo1, Vo2, . . . , VoN to the loads(not shown) connected with its output terminals.

At this time, the backup unit 211 charges based on an output voltage outputted from the rectification/smoothing unit 205.

Figure 5A:
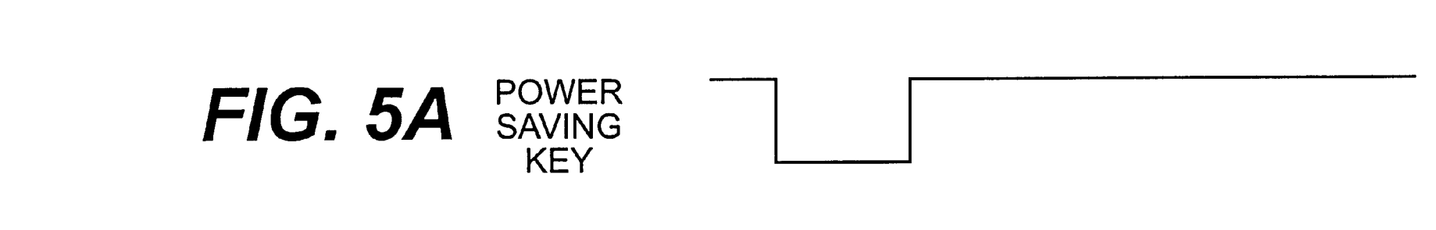
FIGS. 5A through 5C are wave form diagrams illustrating respective control signals which control the switched mode power supply according to the present invention in a standby mode.
Figure 5B:
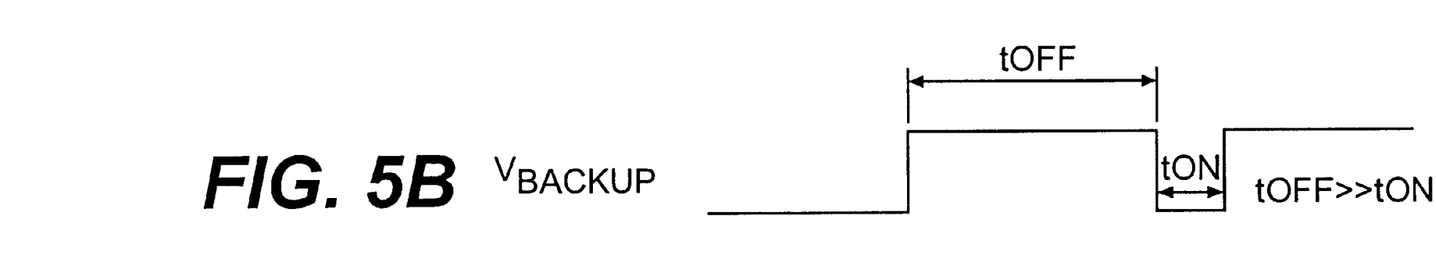
Figure 5C:
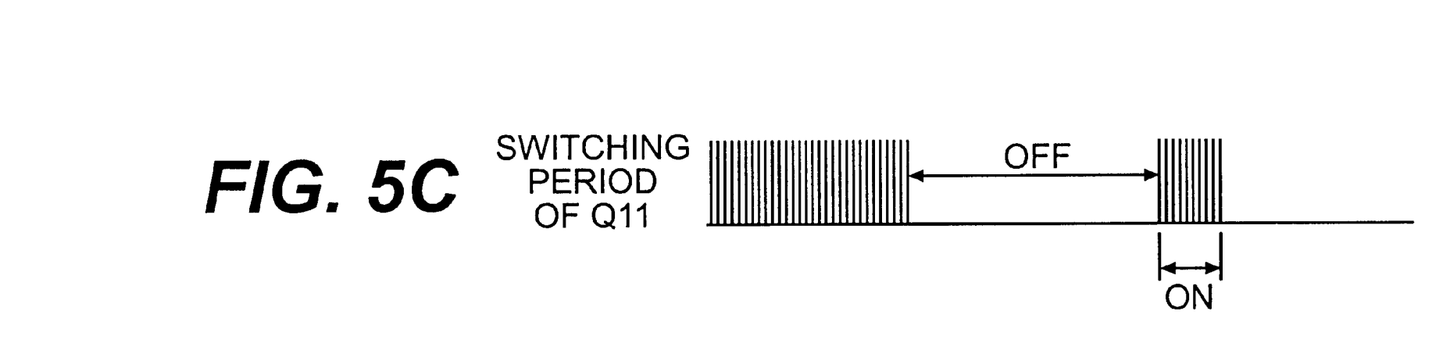

In the normal mode in which the loads consume power normally, when a user actuates a power saving mode key and thereby a signal as shown in FIG. 5A is generated to the microcomputer 210 or when the loads do not consume power for a certain time, the microcomputer 210 outputs a control signal via the resistor R12 so that the photo-coupler PC1 of the signal feedback unit 208 operates. Namely, as shown in FIG. 5B, when the light emitting diode PD1 emits light for the time tOFF, for example 19.5 s, in accordance with the control signal outputted from the microcomputer 210 and the photo-transistor PT1 is thereby turned on, a voltage developed across the resistor R11 and the resistor R14 is applied to the base of the switching device Q12 via the resistor R13, so that an input port of the driving controller 206 assumes a ground level (or low level) and deactivates the operation of the switching device Q11. Therefore, no current flows through the primary winding of the main transformer 204. When the switching operation of the DC from rectification/smoothing unit 202 to the main transformer 204 is stopped, the backup unit 211 supplies power, previously charged in the backup capacitor C16 during the normal mode, to the microcomputer 210. Therefore, the microcomputer 210 maintains a standby mode. The backup capacitor C16 discharges continuously as time elapses, and after the time tOFF, as shown in FIG. 5B, is elapsed, the microcomputer 210 outputs a low level control signal to the feedback unit 208 for a set time tON, for example 0.5 s, so that the photo-coupler PC1 of the signal feed back unit 208 is not operated. Therefore, the switching device Q12 which operates in accordance with the operation of the photo-coupler PC1 is turned off. Because the input port of the driving controller 206 is no longer held at a low (ground) level when the switching device Q12 is turned off, the driving controller 206 is reactivated. As shown in FIG. 5C, when a train of high level pulse signals is outputted from the driving controller 206 to the switching device Q11, the switching device Q11 is repetitively turned on and off. When the switching device Q11 is repeatedly turned on and off, AC voltages are induced in the secondary windings of the main transformer 204. The rectification/smoothing unit 205, which receives the induced AC voltages outputs a plurality of DC output voltages. The backup capacitor C16 of the backup unit 211 receives and charges based on one of the output voltages from among the DC voltages outputted from the rectification/smoothing unit 205.

Next, after the certain charging time tON has elapsed, the microcomputer 210 again outputs the high level control signal to the signal feedback unit 208 for thereby operating the photo-coupler PC1, so that the switching device Q12 is turned on and a ground level is maintained at the input port of the driving controller 206. Thus no high level pulses are applied to the switching device Q11, and the switching device Q11 does not operate.

Next, after the set time tOFF has elapsed, the microcomputer 210 brings the control signal low and thereby stops the operation of the photo-coupler PC1 of the signal feedback unit 208, so that driving controller 206 once again operates the switching device Q11 and power is supplied so that the backup capacitor C16 of the backup unit 211 is again charged.

In the standby mode, the microcomputer 210 controls the signal feed back unit 208 and controls the ON/OFF operation of the driving controller 206 to thereby control the operation of the switching device Q11. The AC voltages induced in the secondary windings of the main transformer 204 are outputted to the rectification/smoothing unit 205, and a charging and discharging operation occurs at the backup capacitor C16 of the backup unit 211. FIG. 5C illustrates the turning ON/OFF periods of the switching device Q11, that is, of the driving controller 206, which correspond to the periods tON/tOFF in FIG. 5B.

In the standby mode, when a user actuates a power turn-on key so that a power on key signal is sent to the microcomputer 210, the microcomputer 210 controls the power supply to escape from the standby mode and once again supply power to the loads.

In the case of inputting the power turn-on key signal: The microcomputer 210 outputs the control signal to the signal feedback unit 208 which turns off the photo-coupler PC1. The switching device Q11 is changed from the turned off state to the turned on state, so that the current is switched through the transformer 204 whereby the rectification/ smoothing unit 205 supplies power to the loads.

In the standby mode, when the power turn on key signal is inputted, the microcomputer 210 operates the timer 209 and judges whether the inputted key signal is a signal set to supply the power to the loads. When the inputted key signal corresponds to the power turn on key signal, the switching device Q11 is operated for supplying power to the loads, and otherwise the system is maintained in the standby mode.

In the above description, even though the operation of the SMPS in accordance with the present invention is exemplified by the intervals of tOFF and tON as 19.5 ms and 0.5 ms in the standby mode respectively, the duty rate (tON/(tOFF+tON)) can be less.

Figure 6:
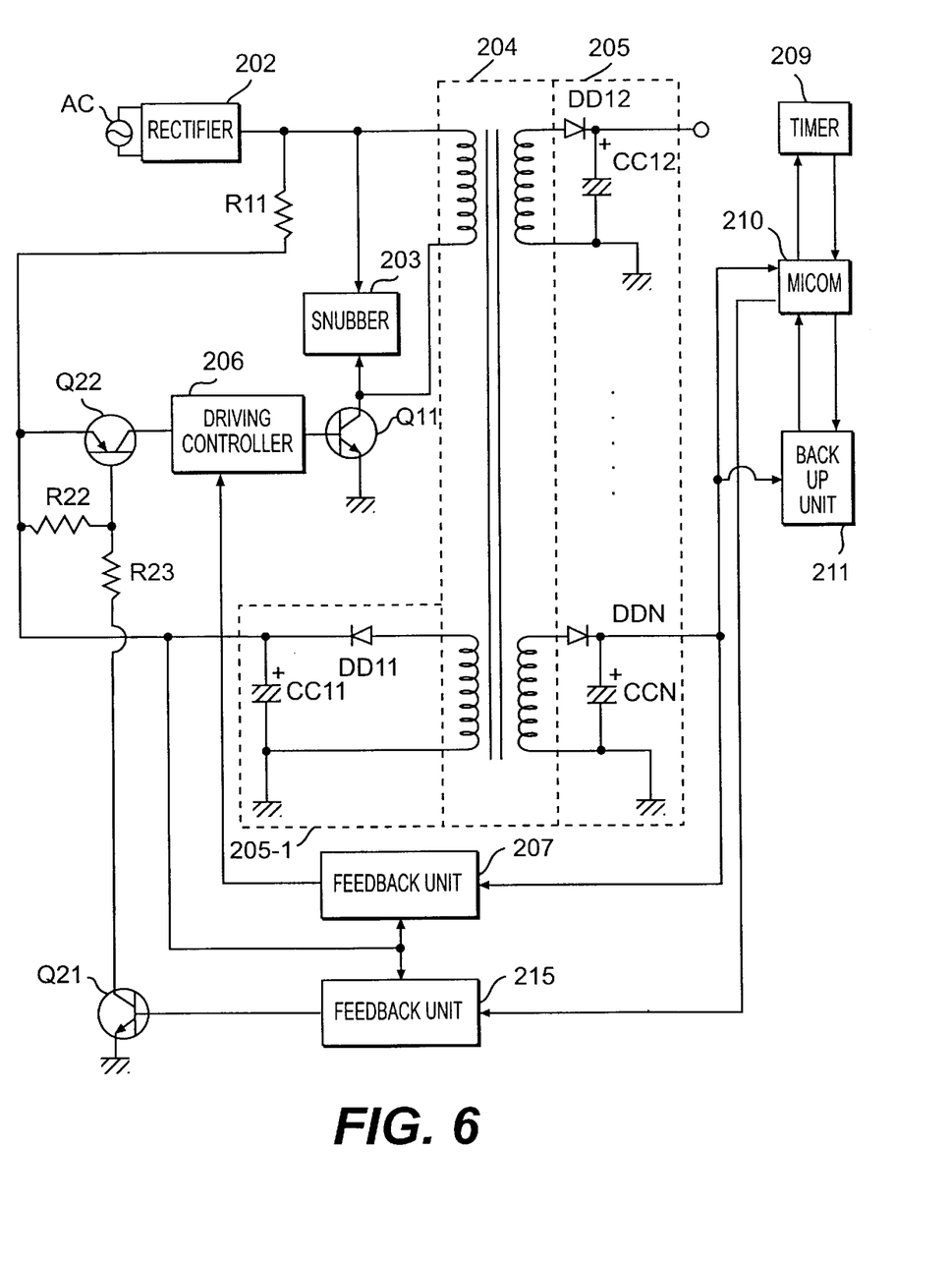
FIG. 6 is a schematic circuit diagram illustrating a switched mode power supply implementing a reduced power consumption method according to a second embodiment of the present invention.

FIG. 6 illustrates a second embodiment of the present invention which includes a main power unit and a control unit.

The main power unit includes a rectification/smoothing unit 202, a transformer 204 transferring power from the primary winding to the secondary winding in accordance with a switching operation of a switching device Qll, a rectification/smoothing unit 205-1 receiving an AC voltage outputted from the auxiliary winding of the transformer 204 and outputting a certain DC voltage, a rectification/ smoothing unit 205 receiving AC voltages induced in the secondary windings of the transformer 204 and outputting a plurality of DC voltages, and a driving controller 206 receiving a control signal from a controller which will be described later and controlling the switching device Q11.

The control unit includes a microcomputer 210 controlling the system, a backup unit 211 supplying power to the microcomputer 210 in the standby mode, a timer 209 generating a timing signal to the microcomputer 210, signal feedback units 207 and 215 operated in accordance with a control of the microcomputer 210, a switching device Q22 turning the driving controller 206 on/off, and a switching device Q21 repeatedly changing the electrical potential of a control electrode of the switching device Q22 (which is connected between the rectifier 202 and the driving controller 206) as between the high and low levels in accordance with a control signal from the signal feedback unit 215 in the standby state. A resistor R22 is connected between the base and emitter of switching device Q22, and a resistor R23 connects the switching devices Q22 and Q21.

The operation of the second embodiment according to the present invention will be explained with reference to the accompanying drawings.

In the normal mode, when the signal feedback unit 215, which is operated in accordance with a control of the microcomputer 210, turns on the switching device Q21, the electrical potential of the base of the switching device Q22 becomes a low state (i.e., ground level), and the switching device Q22 is thereby turned on. Therefore, the output voltage of the rectification/smoothing unit 202 is applied to the driving controller 206 via the switching device Q22. As the driving controller 206 repeatedly turns the switching device Q11 on/off, AC voltages are induced in the secondary windings of the main transformer 204, so that the rectification/smoothing i15 unit 205 outputs a plurality of DC voltages each having a certain level.

One voltage among a plurality of DC voltages outputted from the rectification/smoothing unit 205 is provided as a supply voltage of the microcomputer 210. The signal feedback unit 207 which also receives the above-described supply voltage maintains the operation of the driving controller 206 in an active state in the case that the supply voltage is a certain level, and the backup unit 211 charges based on an electric charge into a capacitor using the supply voltage.

If there is an external signal which corresponds to a standby mode setting key actuated by a user or if the loads do not consume power, the microcomputer 210 outputs a control signal to the signal feedback unit 215 so that the driving voltage supplied from the rectification/smoothing unit 202 to the driving controller 206 is repeatedly supplied and disconnected as switching devices Q21, Q22 are turned on/off. When the switching device Q21 maintains a turned-off state for a certain time in accordance with a control signal from the signal feedback unit 215, since the electric potential of the control electrode of the switching device Q22 maintains a floating state, the switching device Q22 assumes a turned-off state (i.e., Q22 is biased OFF). Therefore, when the supply voltage to the driving controller 206 is disconnected, the driving controller 206 does not turn the switching device Q11 on/off. Therefore, since the AC voltages are not induced in the secondary windings of the main transformer 204, the rectification/smoothing unit 205 does not output any voltages.

The signal feedback unit 207 senses the level of the output voltage rectified and smoothed from one secondary winding of the main transformer 204 and applies the voltage to the driving controller 206 so that the driving controller 206 controls the switching operation of switching device Q11. When no output voltages are outputted from the rectification/smoothing unit 205, the microcomputer 210 receives a supply voltage from the backup unit 211. When the backup unit 211 supplies power to the microcomputer 210 for a certain time which is the discharging time of the backup capacitor, the microcomputer 210 outputs a control signal to the signal feedback unit 215 so that the switching device Q21 maintains a turned-on state for a certain time.

When the switching device Q21 is turned on, a low level signal is applied the base of the transistor composing switching device Q22, and a DC voltage is inputted from the rectification/smoothing unit 202 to the driving controller 206 via the switching device Q22. The driving controller 206 repetitively turns on and off the switching device Q11 and induces voltages in the secondary windings of the transformer 204. The rectification/smoothing unit 205, which receives the induced voltages outputs a plurality of DC voltages, each having a certain level. The signal feedback unit 207 which receives a DC voltage from the rectification/smoothing unit 205 changes the operation state of the driving controller 206 to an active state in accordance with a control of the microcomputer 210, which receives the DC voltage. The backup unit 211 receives the DC voltage and charges the capacitor based thereon.

In the standby mode, the microcomputer 210 controls the signal feed back unit 215 and repeatedly turns the switching devices Q21 on/off to Q22 and thereby activate/deactivate the driving controller 206 and repeatedly turn the switching device Q11 on/off accordingly power is supplied only for a period of time needed to charge the backup capacitor of the backup unit 211, thereby minimizing the power consumption of the switched mode power supply.

Figure 7:
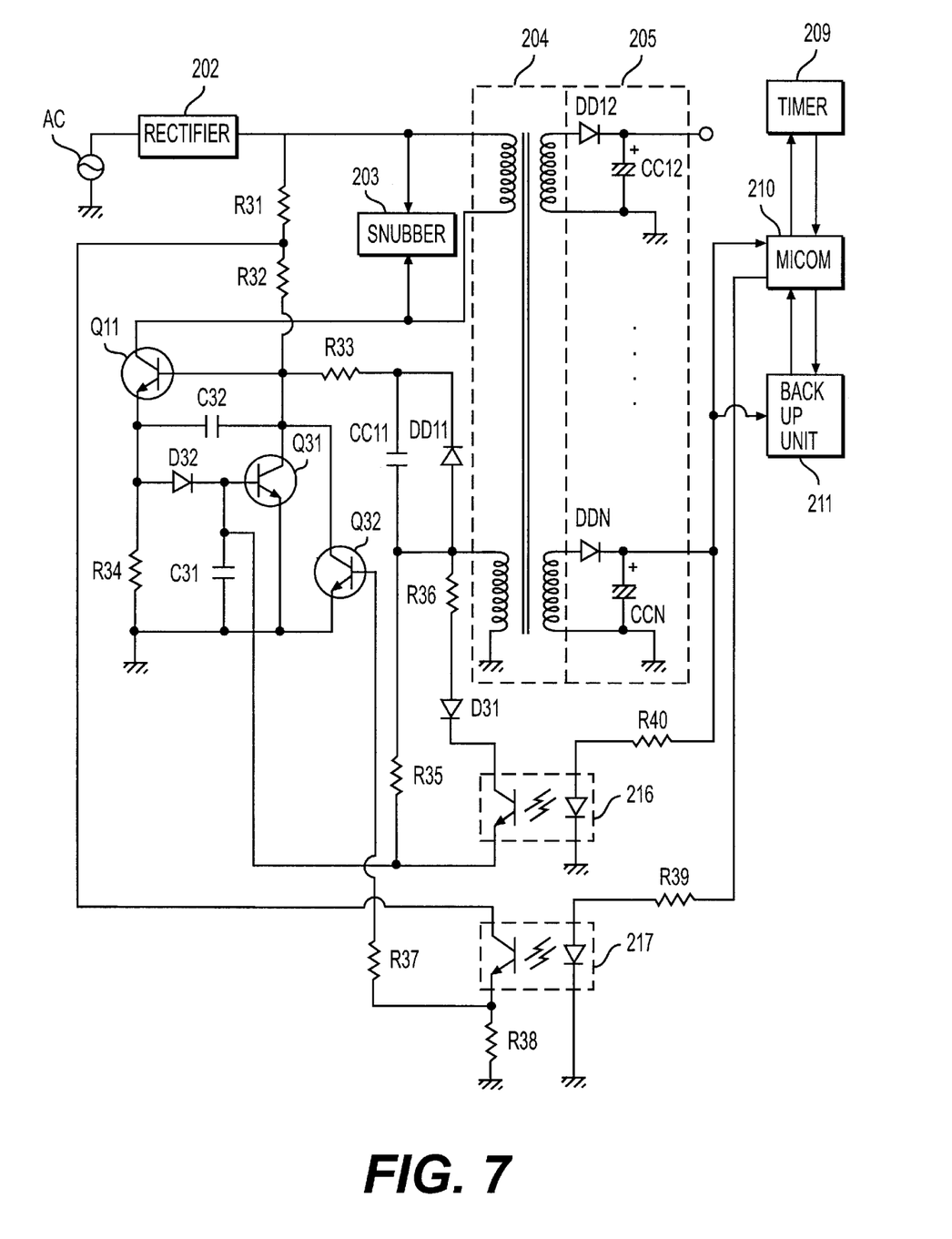
FIG. 7 is a schematic circuit diagram illustrating a switched mode power supply implementing a reduced power consumption method according to a third embodiment of the present invention.

FIG. 7 illustrates a third embodiment of the present invention which is composed of a main power unit and a control unit.

The main power unit includes a rectification/smoothing unit 202, a transformer 204 performing a transforming operation of the DC voltage from rectification/smoothing unit 202 based on the operation of a switching device Q11, and a rectification/smoothing unit 205 receiving AC voltages induced at the secondary side of the transformer 204 and generating a plurality of DC voltages.

The control unit includes a microcomputer 210 controlling the system and receiving a DC supply voltage from the rectification smoothing unit 205, a backup unit 211 receiving the DC supply voltage and supplying backup power to the microcomputer 210 in the standby mode, a timer 209 generating a timing signal to the microcomputer 210, a photo-coupler 216 receiving a DC voltage from the rectification/smoothing unit 205 and accordingly outputting a high level voltage, a switching device Q31 which is turned on by an output voltage of the photo-coupler 216 and is turned off when the current flow direction is changed at the transformer 204, thereby turning ON/OFF the switching device Q1, a photo-coupler 217 supplying and disconnecting the DC voltage from the rectification/smoothing unit 202 for a certain time in response to a control signal from the microcomputer 210 in the standby mode, and a switching device Q32 turning on the switching device when the photo-coupler 217 is operated for a certain time in the standby mode, and turning off when the photo-coupler 217 is not operated for a certain time.

As shown in FIG. 7, a pair of resistors R31 and R32 are connected between the output of the rectifier 202 and a common node. The base of the switching device Q11 is connected to the common node, the switching devices Q31 and Q32 are connected between the common node and ground, and the series connection of a resistor R33, a diode DD11, a resistor R36 and a diode D31 are connected between the photo-coupler 216 and the common node. A capacitor CC11 and a resistor R35 are connected between the resistor R33 and the photo-coupler 216. An auxiliary primary winding of the transformer 204 is connected to the resistors R35 and R36.

As further shown, a resistor R34 connects the switching device Q11 to ground, a capacitor C32 is connected between the resistor R34 and the common node, and a diode D32 is connected between the resistor R34 and the base of the switching device Q31. A capacitor C31 is connected between ground and the base of the switching device Q31, and the base of the switching device 31 is also connected to the photo-coupler 216. Furthermore, resistors R37 and R38 connect the base of the switching device Q32 to ground, and the connection between resistors R37 and R38 is connected to the photo-coupler 217. The photo-coupler 217 is also connected to the connection between resistors R31 and R32. Both photo-coupler 216 and 217 are connected to the microcomputer 210 via resistors R40 and R39, respectively.

The operation of the third embodiment of the present invention will be explained.

In the normal mode, when the microcomputer 210 outputs a low level control signal to the photo-coupler 217, the photo-coupler 217 is not operated, and the switching device Q32 maintains a turned-off state. As a result so that the switching device 031 assumes an ON/OFF state in accordance with the control signal from the feedback unit 216.

At this time, a certain level DC voltage outputted from the rectification/smoothing unit 202 is applied to the base terminal of the switching device Q11 via the resistors R31 and R32, and the switching device Q11 is turned on.

At this time, voltages are induced in the secondary windings based on the current flowing in the primary winding of the transformer 204.

The rectification/smoothing unit 205 rectifies the voltages induced in the secondary windings of the transformer 204 and outputs a plurality of DC voltages each having a certain level, and the photo-coupler 216 receives the supply voltage applied to the microcomputer 210 and outputs a certain level voltage to the base terminal of the switching device Q31. In this state, since the switching device Q31 is turned on, the electric potential of the base terminal of the switching device Q11 becomes a ground electrical potential, so that the direction of the current flowing in the primary winding of the transformer 204 is reversed. Therefore, the direction induced voltages generated in the secondary windings of the transformer 204 are reserved.

Since the electrical potential of the base terminal of the switching device Q31 becomes connected to ground voltage by an output voltage outputted from the auxiliary winding of the transformer 204 via resistor R36, the electrical potential at the base terminal of the switching device Q11 becomes a high level. As the turning ON/OFF operation of the switching device Q31 is repeatedly performed, the switching device Q11 is repeatedly turned ON/OFF, so that voltages are induced in the secondary windings of the transformer 204. The thusly induced AC voltage are rectified and smoothed into a plurality of DC voltages each having a certain level and respectively outputted to each load.

If there is no external input signal for a certain time in a state that the user operates a setting key for the standby mode (power consumption mode) or the loads are not normally operated, the microcomputer 210 outputs a control signal to the photo-coupler 217, and the switching device Q32 is turned on, and the electrical potential of the base terminal of the switching device Q11 becomes a ground electric potential. When the base terminal of the switching device Q11 is connected with the ground, no current is switched through the primary winding of the transformer 204. In this state, the microcomputer 210 receives power from the backup unit 211.

After a certain time, which is the discharging time of the backup capacitor, has elapsed, the microcomputer 210 outputs a low level ON control signal, so that the photo-coupler 217 is turned off. If there is no output from the photo-coupler 217, the switching device Q11 is turned on, and current flows through the primary winding of the transformer 204, and AC voltages are induced in the secondary windings.

The rectification/smoothing unit 205 rectifies and smoothes the AC voltages induced in the secondary windings of the transformer 204 and outputs a plurality of DC voltages.

When there is an output voltage at the rectification/smoothing unit 205, the photo-coupler 216 applies a certain level voltage to the base terminal of the switching device Q31. The switching device Q31 is turned on, and the base terminal of the switching device Q11 becomes a ground electrical potential. The flowing direction of the current in the primary winding of the transformer 204 is reversed, and the flowing direction of the currents in the secondary windings is reversed, so that AC voltages are induced.

The electrical potential of the base terminal of the switching device Q31 is lowered to ground level via the auxiliary winding of the transformer 204, so that the electrical potential of the base terminal of the switching device Q11 becomes a high level. As the switching device Q31 is repeatedly turned ON/OFF, the switching device Q11 is repeatedly turned ON/OFF, so that AC voltages are induced in the secondary windings of the transformer 204, and the thusly induced AC voltages are rectified and smoothed into a plurality of DC voltages each having a certain level. One DC voltage among the plurality of DC voltages is supplied as a supply voltage to the microcomputer 210, and the backup capacitor of the backup unit 211 is charged thereby.

As time elapses, the backup capacitor of backup unit 211 is discharged, and the microcomputer 210 outputs a high level control signal and operates the photo-coupler 217, so that a high level voltage is applied to the base terminal of the switching device Q32.

At this time, as the switching device Q32 is turned on, the electrical potential at the base terminal of the switching device Q11 becomes a ground electrical potential, so that the switching device Q11 maintains a turned off state, so that the switching operation of current through the transformer 204 is stopped.

Therefore, the operation in which the photo-coupler 217 is operated for a certain time(discharging time of the backup capacitor) and then is stopped, with This operation being repeatedly performed so that the charging and discharging operation is repeatedly performed for the backup capacitor in the backup unit 211. In the standby mode, the power which is used by the power supply is minimized.

Figure 8:
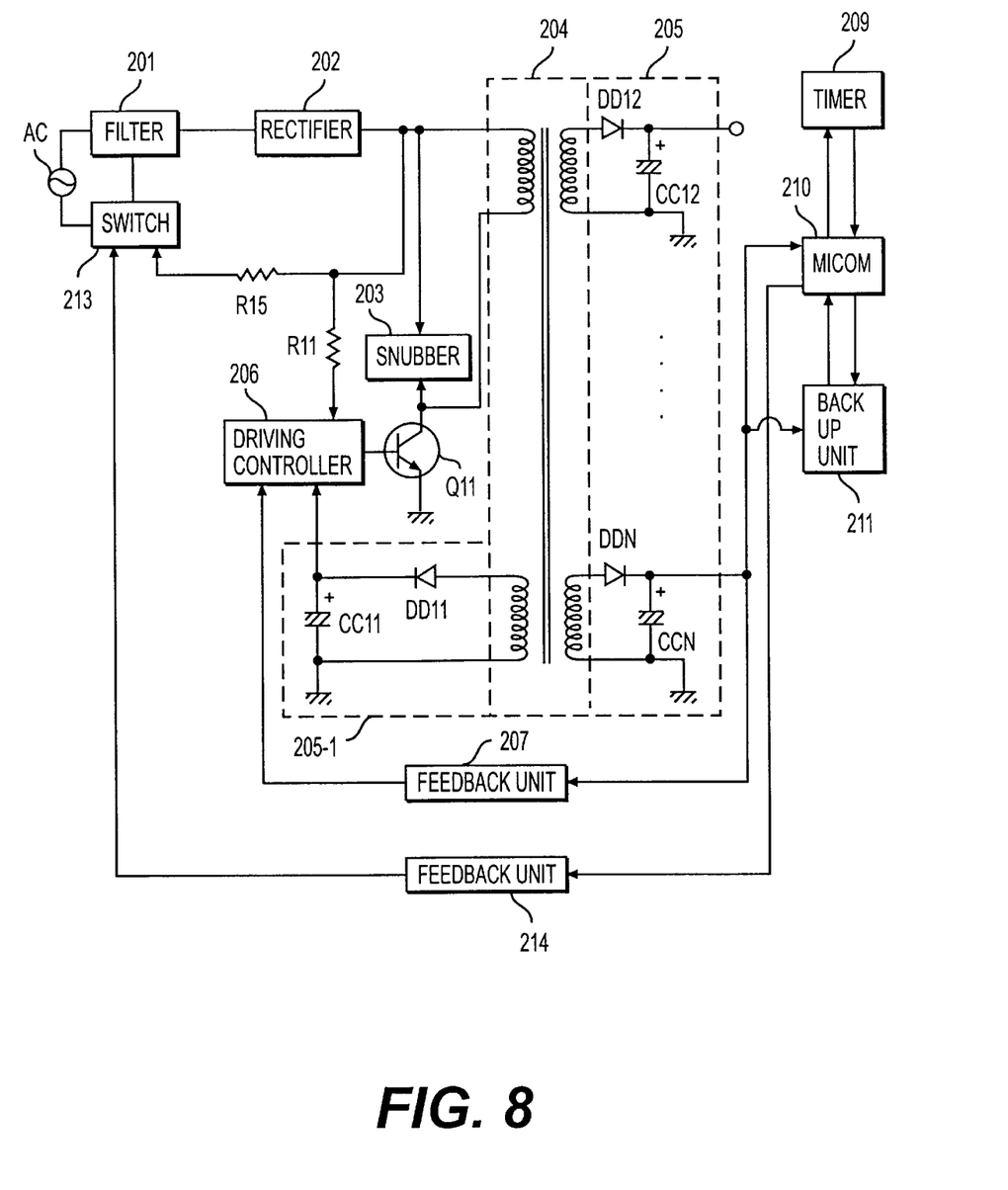
FIG. 8 is a schematic circuit diagram illustrating a switched mode power supply implementing a reduced power consumption method according to a fourth embodiment of the present invention.

FIG. 8 illustrates a fourth embodiment of the present invention which is formed of a main power unit and a controller.

The main power unit includes an input filter unit 201 receiving AC mains power, a rectification/smoothing unit 202, a transformer 204 to a primary winding of which is supplied a DC voltage from rectification/smoothing unit 202 in accordance with a switching operation of a switching device Q11, a rectification/smoothing unit 205-1 generating a certain DC voltage from the AC voltage induced in an auxiliary winding of transformer 204, a rectification/smoothing unit 205 generating plural DC voltages from the AC voltages induced in multiple secondary windings of the transformer 204, and a driving controller 206 receiving the output voltages of the rectification/smoothing unit 202 and the rectification/smoothing unit 205-1 and receiving an output signal of a signal feedback unit 207, which will be explained later, for thereby controlling the switching device Q11.

The controller includes a switch unit 213 connected with the AC mains power source, and an input terminal of the input filter unit 201 and, via a resistor R15, the output of the rectifier 202. This switch unit 213 repeatedly performs an AC power supplying and disconnecting operation. The computer further includes a microcomputer 210 controlling the system and judging the standby mode, a backup unit 211 supplying backup power to the microcomputer 210 in the standby mode, a timer 209 generating a timing signal to the microcomputer 210, a signal feedback unit 207 controlling the driving controller 206 in accordance with a control of the microcomputer 210, and a signal feedback unit 214 repeatedly performing a turning ON/OFF operation of the switch unit 213 for a certain time in accordance with a control of the microcomputer 210. Here, the switch unit 213 checks the output voltage of the rectification/smoothing unit 202. If there is an error, the switch unit 213 is turned off.

The operation of the fourth embodiment according to the present invention will be explained.

In a normal state where the loads normally consume power, in the case that the power supply is not being normally operated, the microcomputer 210 controls the signal feedback unit 214 and maintains the turned-on state of the switch unit 213. Therefore, when the switch unit 213 is in the turned-on state, noise is removed from the AC mains power by the input filter unit 201 and the thusly noise-removed AC voltage is changed to a certain level DC voltage by the rectification/smoothing unit 202 and is applied to the transformer 204 and the driving controller 206.

As the driving controller 206 turns the switching device Q11 on/off AC voltages are induced in the secondary windings of the transformer 204. The thusly induced voltages are rectified and smoothed by the rectification smoothing unit 205 and are outputted as a plurality of DC voltages each having a certain level.

One DC voltage among the plurality of DC voltages outputted from the rectification/smoothing unit 205 is supplied as a supply voltage of the microcomputer 210, and the signal feedback unit 207, which checks the supply voltage, maintains the operation of the driving controller 206 in an active state in the case that the supply voltage is a certain level voltage. The backup unit 211 receives the voltage supplied to the microcomputer 210 and charges the backup capacitor of the backup unit 211.

In the normal state that the switched mode power supply normally operates, if there is no external input signal for a certain time in a state that the user inputs an external input signal for setting the standby mode or the loads are not normally operated, the microcomputer 210 outputs an ON/OFF control signal to the signal feedback unit 214. This causes the switch unit 213 connected, with one input terminal of the input filter unit 201, to repeatedly turn ON/OFF for a certain time. Therefore, the DC voltage is not outputted from the rectification/smoothing unit 202 in the case that the switch unit 213 is turned off for a certain time in accordance with the control of the microcomputer 210, so that the driving controller 206 does not operate the switching device Q11. If the switching device Q11 is not operated, since no AC voltages are induced in the secondary windings of the transformer 204, the microcomputer 210 receives a supply voltage from the backup unit 211. In addition, the signal feedback unit 207 renders the driving controller 206 to an inactive state since a voltage is not supplied from the rectification/smoothing unit 205 to the microcomputer 210.

As the time elapses, if the voltage charged in the backup unit 211 is discharged to below a certain level, the microcomputer 210 controls the signal feedback unit 214, so that the switch unit 213 maintains a turned on state for a certain time. The DC voltage is applied to the driving controller 206 via the input filter unit 201 and the rectification/smoothing unit 202, and then the driving controller 206 operates the switching device Q11 so that AC voltages are induced in the secondary windings of the transformer 204. The rectification/smoothing unit 205, which receives the thusly induced AC voltages, outputs a plurality of DC voltages each having a certain level.

At this time, the signal feedback unit 207 which senses the DC voltage supplied from the rectification/smoothing unit 205 to the microcomputer 210 maintains the operation of the driving controller 206 in an active state since the DC voltage is maintained as a supply voltage for the microcomputer 210. In addition, the backup unit 211 charges the supply voltage into the capacitor of the backup unit 211.

Therefore, in the standby mode, the microcomputer 210 controls the signal feedback unit 214 so that the switch unit 213 is repeatedly turned ON/OFF for a certain time for thereby minimizing the power consumption of the powered apparatus.

Figure 9:
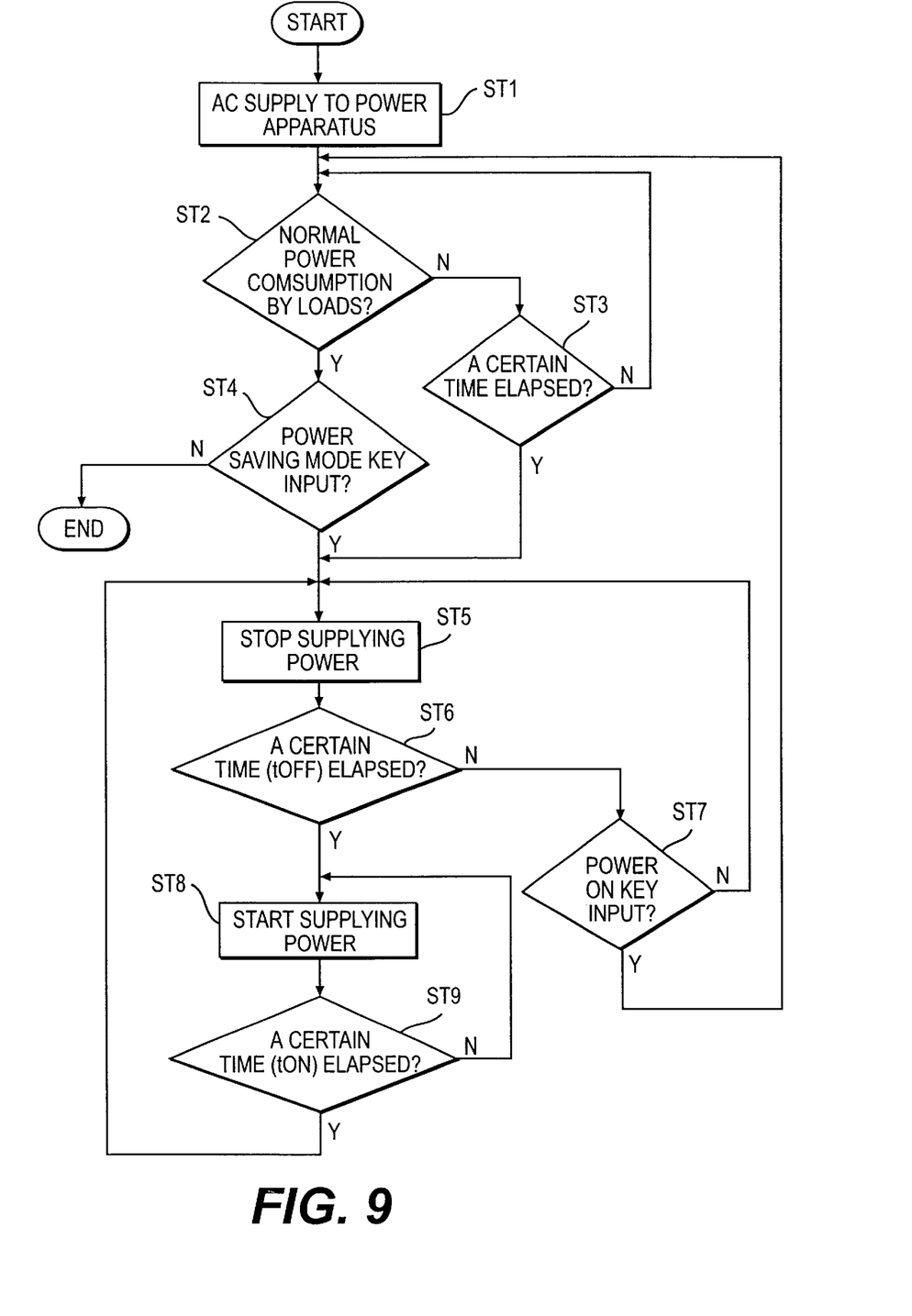
FIG. 9 is a flow chart illustrating a power consumption decreasing method for a switched mode power supply according to the present invention.

FIG. 9 is a flow chart illustrating the power consumption decreasing method for a switched mode power supply according to the present invention.

When AC mains power is inputted into the switched mode power supply in Step ST1, the microcomputer judges whether the loads normally consume power in Step ST2. If the microcomputer determines that the loads do not normally consume power, it re-determines that continuously until a certain time elapses in Step ST3. If the microcomputer determines that the loads normally do not consume power after the certain time has elapsed in Step ST3, it controls the system to stop supplying power in Step ST5. Then the microcomputer continuously does not supply power to the loads for a certain time (tOFF) in Step ST6 unless it is judged that a power turn on key has been inputted in the subroutine in Step St 7. If it is judged that the power turn on key is inputted in Step ST7, flow returns again to Step ST2.

If the certain time which is the discharging time (tOFF) of the back-up capacitor is elapsed in Step ST6, the microcomputer causes the system to supply power to the loads in Step ST8 and the backup capacitor is charged for a certain time (tON) in Step ST9. If the certain time (tON) which is the backup capacitor charging time is judged to have elapsed in Step ST9, the microcomputer controls the system to stop supplying power the loads by returning flow to Step ST5. Thereafter, Steps ST5, 6, 7, 8 and 9 are repeatedly performed, so that the power saving mode is implemented.

However, if the microcomputer judges that the loads normally consume power in Step ST2 and the user inputs any other key signal except for the power saving mode key signals in Step ST4, the switched mode power supply supplies power to the loads or does not respond to the key signal. If the power saving key signal is judged to have been inputted by the user in Step ST4, the control unit causes the power not to be supplied to the loads in ST5.

As described above, since the switched mode power supplies according to the present invention do not require the conventional auxiliary power supply, their sizes may become small and their fabrication cost may be decreased. In another embodiment of the present invention, in the standby mode, it is possible to supply a minimum power for driving the microcomputer, so that the power supply operates based on a minimum power. In addition, it is possible to decrease the switching noises by a switching operation of the supply of the AC mains power for a certain time tOFF during a certain period tON+tOFF, so that the reliability of the device is increased, and the present invention may be adapted to all kinds of electric apparatuses which use the switching mode power supply. The advantageous reduction in standby mode power supply consumption is achieved by making the interval of tOFF greater, preferably much greater, than the interval of tON.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A power supply circuit, comprising:
    a power converter converting AC power to DC power to supply the DC power to at least one load;
    a control circuit controlling operation of the power converter, the control circuit detecting if the load consumes the DC power, and placing the power supply circuit in a power-saving mode if the load does not consume power for a predetermined amount of time, the control circuit repeatedly enabling the conversion operation of the power converter for a first predetermined period of time and disabling the conversion operation for a second predetermined period of time, greater than said first predetermined period of time, in the power savings mode of operation.

2. The power supply circuit of claim 1, wherein the power converter is the only power converter.

3. The power supply circuit of claim 1, wherein the control circuit automatically repeatedly enables and disables the conversion operation in the power saving mode.

4. The power supply circuit of claim 1, wherein the ratio of the first predetermine period of time to a sum of the first and second predetermined periods of time is less than or equal to 0.025.

5. The power supply circuit of claim 1, wherein the control circuit comprises:
    a detector detecting an output DC voltage of the power converter;
    a driving controller controlling operation of the power converter based on output from the detector so that the power converter outputs the DC voltage at a constant level.

6. The power supply circuit of claim 5, wherein the control circuit further comprises:
    a feedback control circuit generating a first control signal; and wherein
    the driving controller enables and disables the conversion operation of the power converter based on the control signal.

7. The power supply circuit of claim 6, wherein the feedback control circuit comprises:
    a microcomputer generating a second control signal indicating whether to enable or disable the power converter, the microcomputer generating the second control signal to enable the conversion operation of the power converter for the first predetermined period of time and to disable the conversion operation for the second predetermined period of time in the power saving mode of operation; and
    a signal feedback circuit generating the first control signal based on the second control signal.

8. The power supply circuit of claim 7, wherein the signal feedback circuit comprises:
    an opto-isolator operating in accordance with the second control signal; and
    a first switching device turning on and off to supply the first control signal to the driving controller based on output from the opto-isolator.

9. The power supply circuit of claim 8, wherein the opto-isolator is a photo-coupler.

10. The power supply circuit of claim 8, wherein
the driving controller includes a second switching device which turns on and off to enable the conversion operation; and
the first switching device turns the second switching device off for the second predetermined period of time to disable the power conversion operation in the power savings mode.

11. The power supply circuit of claim 7, wherein
the driving controller includes a first switching device which turns on and off to enable the conversion operation; and
the signal feedback circuit generates the first control signal to turn off the first switching device during the second predetermined period of time in the power savings mode.

12. The power supply circuit of claim 7, wherein the control circuit further comprises:
a back-up power storage unit supplying power to the microcomputer when the power converter is disabled; and wherein
the microcomputer receives the DC voltage from the power converter as a source of power.

13. The power supply circuit of claim 6, wherein
the driving controller includes a first switching device, which turns on and off to enable the conversion operation, and control circuitry, which controls operation of the first switching device based on the output of the detector and a power supplied to the power supply circuit; and
the feedback control circuit includes a second switching device controlling a supply of power to the control circuitry as a first control signal, a third switch controlling operation of the second switch, and feedback circuitry controlling operation of the third switch such that the second switch cuts off the supply of power to the control circuitry during the second predetermined period of time in the power savings mode.

14. The power supply circuit of claim 1, wherein the control circuit comprises:
a first switching device, which turns on and off to enable the conversion operation; and
a feedback control circuit turning the first switching device off during the second predetermined period of time in the power savings mode.

15. The power supply circuit of claim 14, wherein the feedback control circuit comprises:
a second switching device controlling operation of the first switching device; and
a controller controlling operation of the second switching device to turn the first switching device off during the second predetermined period of time in the power savings mode.

16. The power supply circuit of claim 15, wherein the feedback control circuit further comprises:
a detector detecting an output DC voltage of the power converter; and
a third switching device controlling operation of the first switching device based on output from the detector so that the power converter outputs the DC voltage at a constant level.

17. The power supply circuit of claim 1, wherein the control circuit comprises:
a switching device selectively supplying a source of AC power to the power converter; and
a feedback control circuit controlling operation of the switching device so that the switching device disconnects the source of AC power from the power converter during the second predetermined period of time in the power savings mode.

18. The power Supply circuit of claim 1, wherein the control circuit is powered by a DC voltage output from the power converter, and includes a back-up power storage unit supplying power when the power converter is disabled.

19. The power supply circuit of claim 1, wherein
the power converter provides a plurality of DC voltage outputs; and
the control circuit includes a switching unit selectively outputting each of the DC voltage outputs.

20. A power supply circuit, comprising:
a power converter converting AC power to DC power to supply the DC power to at least one load; and
a control circuit controlling operation of the power converter, the control circuit detecting if the load consumes the DC power, and placing the power supply circuit in a power saving mode if the load does not consume power for a predetermined amount of time, controlling a supply of the AC power to the power converter such that the power converter is periodically disconnected from the AC power during the power savings mode.

21. The power supply circuit of claim 20, wherein the control circuit comprises:
a first switching device selectively supplying the AC power to the power converter in response to a control signal; and
a feedback circuit generating the control signal such that the first switching device periodically disconnects the AC power from the power converter during the power savings mode.

22. The power supply circuit of claim 21, wherein the feedback circuit comprises:
a photo-coupler generating the control signal in response to an instruction signal; and
a microcomputer generating the instruction signal.

23. The power supply circuit of claim 21, wherein the control circuit further comprises:
a detector detecting an output DC voltage of the power converter; and
a driving controller controlling operation of the power converter based on output from the detector so that the power converter outputs the DC voltage at a constant level.

24. A method of supplying power, comprising:
detecting whether at least one load connected to a power converter consumes power output from the power converter,
judging that operation in a power savings mode should occur when the detecting step indicates that the load has not consumed power for a predetermined amount of time; and
alternately enabling and disabling a power conversion operation of a power converter such that the power conversion operation is enabled for a first predetermined period of time and is disabled for a second predetermined period of time, greater than the first predetermined period of time, when the judging step judges that operation in the power savings mode should occur.

25. The method of claim 24, wherein the ratio of the first predetermined period of time to a sum of the first and second predetermined periods of time is less than or equal to 0.025.

26. The method of claim 24, further comprising:

receiving input instructing that a normal mode of power conversion should occur; and continuously enabling the power conversion operation in response to the received input.

27. The method of claim 24, wherein the first predetermined period of time corresponds to a charging time of a back-up power storage unit in a control circuit controlling operation of the power converter, and the second predetermined period of time corresponds to a discharging time of the back-up power storage unit.

28. The method of claim 24, wherein the enabling and disabling step enables and disables the power conversion operation by connecting and disconnecting an AC power source to and from the power converter.

29. The method of claim 28, wherein the first predetermined period of time corresponds to a charging time of a back-up power storage unit in a control circuit controlling operation of the power converter, and the second predetermined period of time corresponds to a discharging time of the back-up power storage unit.

30. A power supply circuit, comprising:

a power converter converting AC power to DC power to supply the DC power to at least one load;

a detector detecting an output DC voltage of the power converter;

a driving controller controlling operation of the power converter based on output from the detector and a control signal so that the power converter outputs the DC voltage at a constant level;

a microcomputer determining based on output of the detector if the load consumes the DC power, placing the power supply circuit in a power saving mode if the load does not consume power for a predetermined amount of time, and generating the control signal to enable the conversion operation of the power converter for the first predetermined period of time and to disable the conversion operation for the second predetermined period of time in the power saving mode of operation, the microcomputer receiving power from the power converter when the power converter is enabled; and a back-up power storage unit supplying power to the microcomputer when the power converter is disabled.

31. The power supply circuit of claim 30, wherein the back-up power supply stores the DC power output from the power converter when the power converter is enabled.

32. The power supply circuit of claim 31, wherein the backup power supply includes a capacitor.

* * * * *